INVENTOR.
WILLIAM G. CAMPBELL, JR.
BY
Christie Parker & Hale
ATTORNEY.

INVENTOR.
WILLIAM G. CAMPBELL, JR.
BY
Christie, Parker & Hale
ATTORNEYS.

INVENTOR.
WILLIAM G. CAMPBELL, JR.
BY Christie, Parker & Hale
ATTORNEYS.

United States Patent Office 3,507,459

Patented Apr. 21, 1970

3,507,459

TAPE TRANSPORT CONTROL SYSTEM

William G. Campbell, Jr., Los Angeles, Calif., assignor to Ex-Cell-O Corporation, Detroit, Mich., a corporation of Michigan Filed Feb. 19, 1968, Ser. No. 706,467
Int. Cl. B65h *59/38, 59/40*
U.S. Cl. 242—190 7 Claims

ABSTRACT OF THE DISCLOSURE

A tape control system for controlling the transfer of tape in a reel to reel tape transport. The system includes means for transferring the tape between the reels, means for sensing any slack in the tape and providing a signal indicative of the lack of slack, and control means responsive to the signal to stop the transfer of tape between the reels for a pre-determined interval and then to re-initiate the transfer of tape after the interval at a gradually increasing rate of speed until a preselected maximum rate is reached.

This invention relates to a tape transport system and more particularly to a control circuit for controlling the transfer of tape from one reel to another reel in the transport system.

Tape transport system in which a tape is transferred from one reel to another for transducing operations are well known in the art. These tape transport systems are employed in both magnetic and paper tape systems. Once the tape is transferred from one reel to another reel at the completion of a transducing operation, as a result of either recording information on the tape or reading the information previously recorded, it is necessary to transfer the tape back to the other reel for subsequent usage. These rewind operations, as they are termed in the art, are effected at fairly high speeds and subject the tape to breakage or damage when the tape is in a high speed rewind operation. This is particularly true in paper tape transport systems.

In a paper tape system, for example, during a high speed rewind operation, one reel is powered to effect the rewind operation while the other reel is free wheeling or is driven in response to the driving of the other reel. Generally, shortly after the rewind operation is initiated and when all the slack in the tape that extends between the reels is eliminated, a sudden jerk may occur and break or damage the tape. It is, therefore, necessary to provide a control system that would omit any possibility of tape breakage and yet allow the rewind operation to be effected at high speed in a tape transport system.

The present invention provides an improved tape transport system including a tape transport system that allows high speed rewind operations that essentially eliminates all possibilities of tape breakage during the rewind operation. The invention employs an improved control circuit for effecting the high speed rewind operation that eliminates any sudden acceleration of the tape during the rewind operation and thereby eliminates the possibility of tape breakage or damage. The elimination of the tape breakage is effected by stabilizing the tape transport system during the interval that the breakage normally occurs during the rewind operation and then initiating the transfer of tape from one reel to the other reel.

From a method standpoint, the present invention is directed to a method for transferring tape from one storage reel to another storage reel wherein the transfer of a tape from one reel to the other reel is initiated at a preselected speed for eliminating any tape slack. The method further includes the step of sensing when all the slack is eliminated and in response thereto preventing the rotation of the reels for a preselected interval to stabilize the tape transport system. After stabilization of the system, the actual transfer of tape between reels or spools is initiated with tape being transferred at a controlled rate of travel.

From an apparatus standpoint, the present invention comprises a pair of spaced, rotatable tape storage reels adapted for transferring tape from one reel to the other and having the tape extending between the reels. Swingable tape sensing and guiding arms are associated with each reel and extend outwardly thereof to engage the tape extending between the reels whereby they are movable in accordance with the amount of tension in the tape loop between different zones and thereby signalling the amount of slack of the tape including a signal indicative of lack of tape slack. Switching means are coupled to each of the said arms for the signalling of the swinging of the tape sensing and guiding arms from one zone to another zone. Individual means for controlling the rotation of said reels is provided along with control means for energizing the individual means and connected to be responsive to the switching means for effecting the desired rewind operation. The control means, when energized, allows the initial transfer of tape until the tape sensing and guiding arms signal the elimination of any slack in the system wherein the control means functions to stabilize the tape transport system for a preselected interval and then allows the continuation of the tape transfer at a controlled rate of travel.

These and other features of the present invention may be more fully appreciated when considered in the light of the following specification and drawings, in which.

Figures 2, 4:
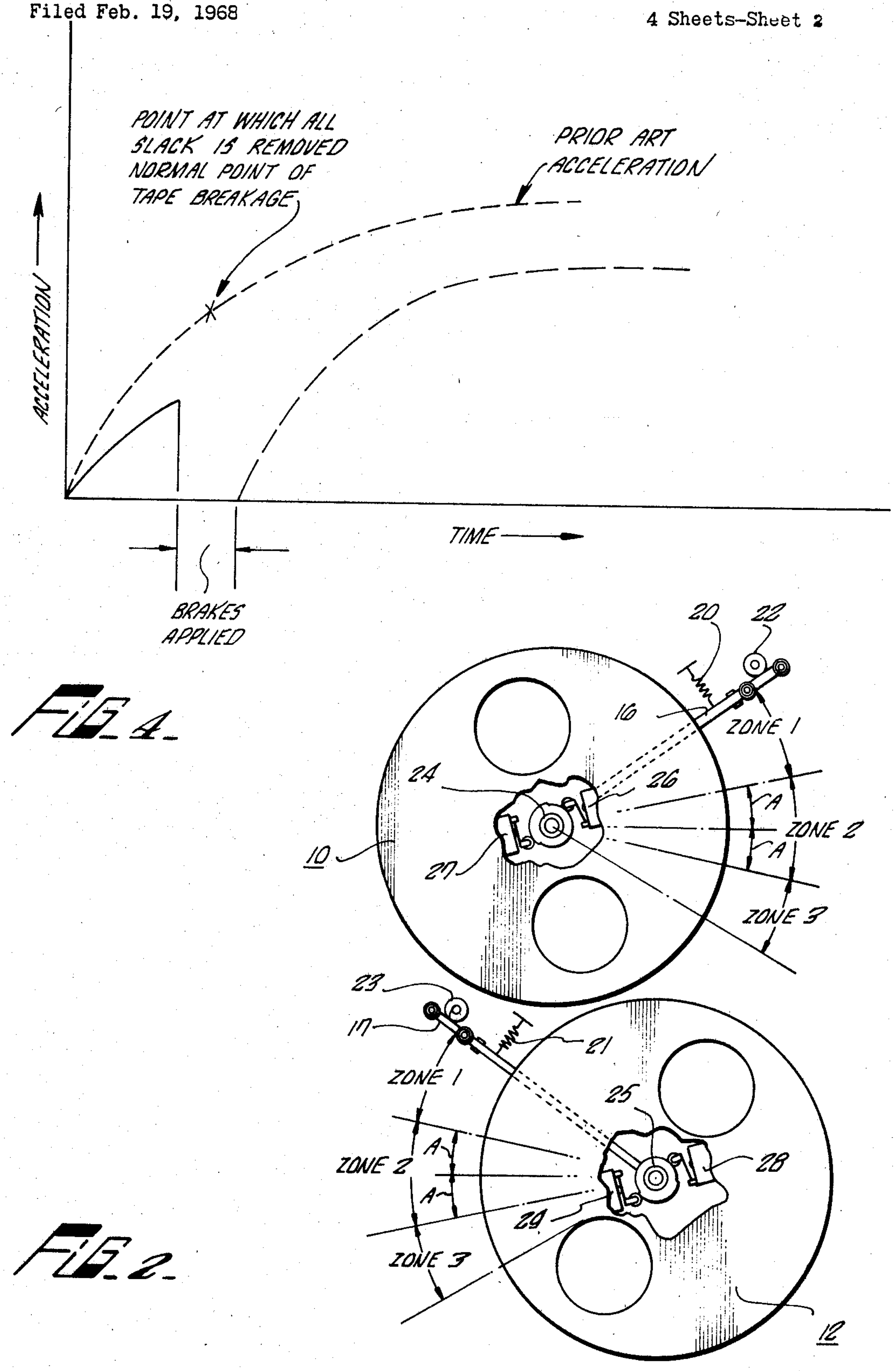
FIG. 2 is a front view, with portions broken away, of the system of FIG. 1 showing the various zones through which the tape guiding arms swing in relationship with their signalling means.
Figure 3A:
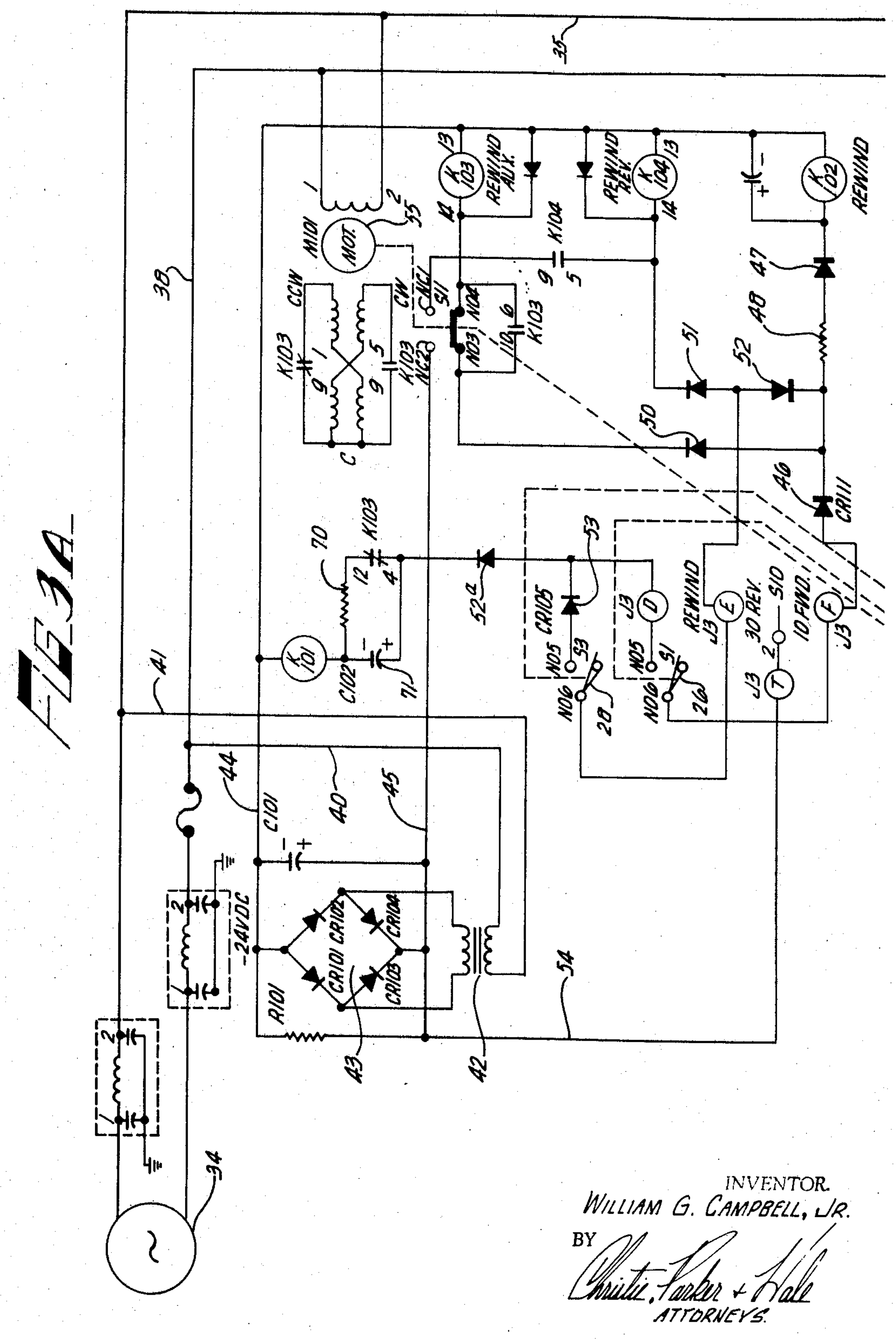
Figure 3B:
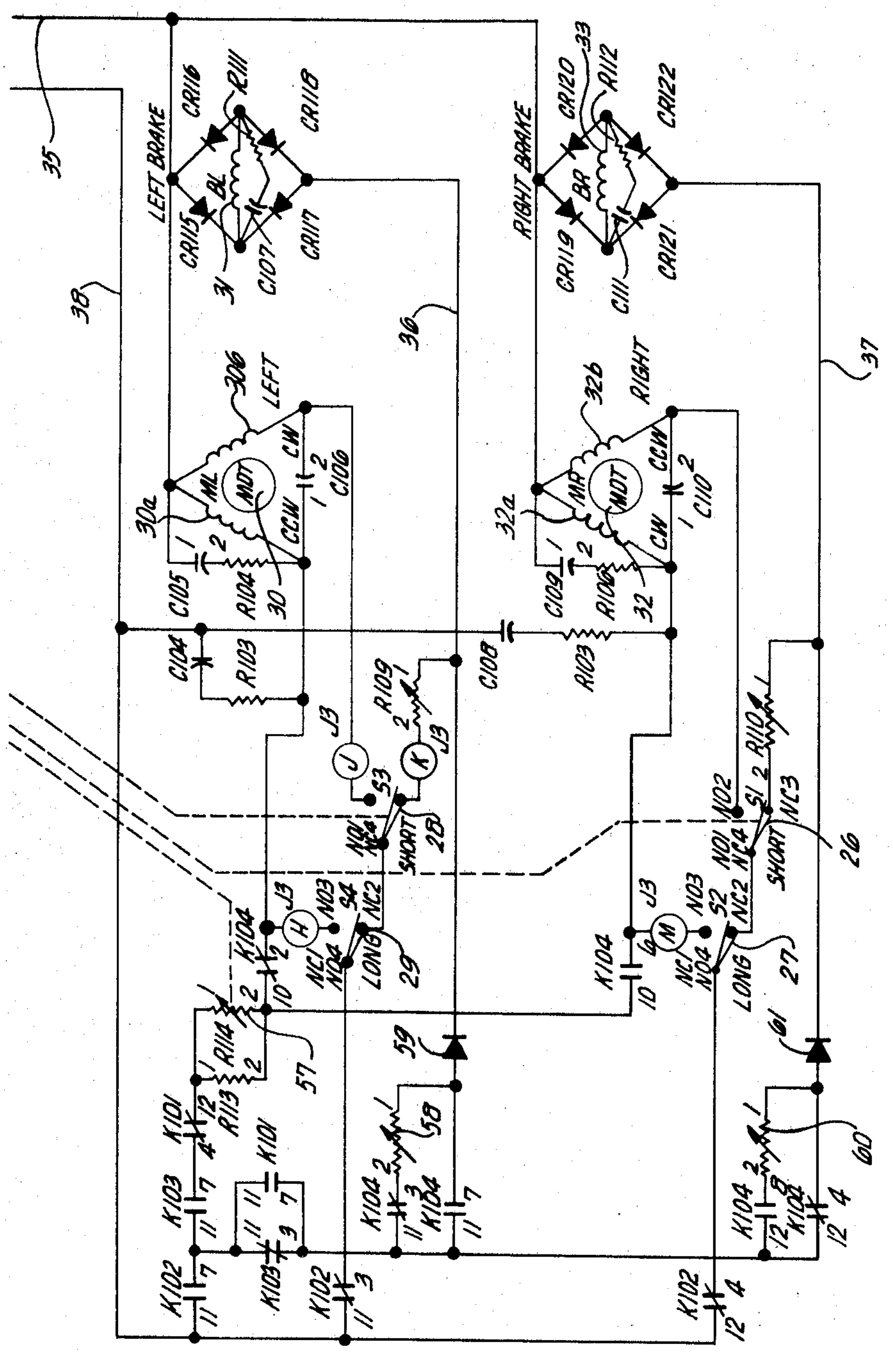

FIGS. 3A and 3B comprise a schematic illustration of the tape transfer control circuit embodying the invention; and FIG. 4 is a graphical illustration of an acceleration characteristic for a prior art type of rewind operation relative to the acceleration characteristics afforded by the present invention.

Now referring to the drawings, the apparatus of the present invention will be examined in detail. It should be understood that although the present invention is incorporated in a tape transport system for a paper tape reader-spooler combination, it may be used in any system wherein a material is to be transferred from one reel without reference to the type of material being processed.

Figure 1:
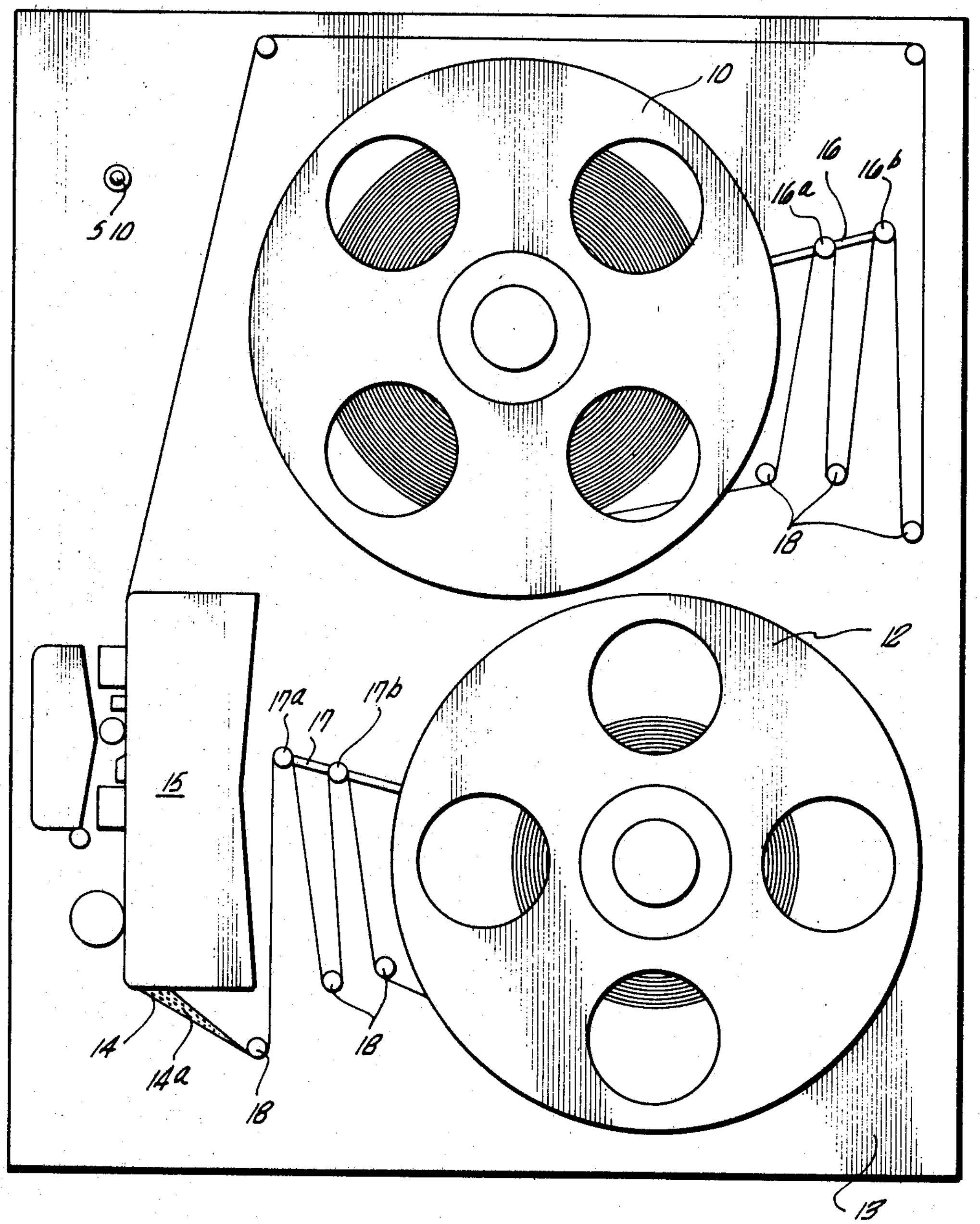
FIG. 1 is a front view of a typical paper tape transport system.

Referring in particular to FIG. 1, wherein there is illustrated a pair of tape storage reels or spools 10 and 12 mounted on a panel 13 in spaced apart relationship for transferring paper tape 14 therebetween. The paper tape 14 having binary coded information recorded thereon, in terms of perforations 14A, is illustrated as a tape extending between the reels 10 and 12 and passed by a photoelectric reading device, generally identified by the reference character 15. The tape 14 is tensioned and guided by means including a pair of tensioning and guiding arms mounted with each of the tape reels 10 and 12. The tape sensing and guiding arm for the reel 10 is identified by the reference character 16, while the guiding arm 17 is associated with the reel 12. As illustrated, each of the guiding arms 16 and 17 include a pair of outwardly extending guides 16A and 16B and 17A and 17B respectively. Also mounted on the panel 13 are a plurality of tape guides similar to the guide 18 in preselected locations guiding the tape through a preselected path to the transducer 15 between the reels 10 and 12 and for providing the correct amount of tension in the loop of tape 14 extending between the reels 10 and 12. The panel 13 also mounts a rewind switch, identified as a switch S10 for effecting the rewind operation in either the forward or the reverse direction. The switch S10 is a single pole double throw switch. It will be appreciated that the above-described structure is a more or less conventional arrangement of a reel to reel transport system and that the operation of switch S10 in either direction will cause the tape to be taken off of one of the reels 10 and 12 and stored on the other reel. For the purpose of the present invention, a forward rewind operation is effected when the tape 14 is transferred from the reel 10 onto the reel 12 and that a reverse rewind operation is effected when the tape is transferred from the spool 12 to the spool 10. The spool 10 may also be considered as the right hand spool, while the spool 12 is a left hand spool whereby the forward rewind operation is a right to left transfer.

The tape sensing and guiding arms 16 and 17 also function to signal the amount of tape slack in the tape loop extending between the reels 10 and 12. For this purpose, the arms 16 and 17 are adapted to be swingable through a preselected arc for signalling whether the tape slack is too large, too small or the correct amount. For this purpose the arms 16 and 17 are biased by means of individual springs diagrammatically illustrated as the springs 20 and 21 for the arms 16 and 17, respectively, for urging them in a position towards the posts 22 and 23 respectively, as illustrated. The posts 22 and 23 are mounted at one extremity of zone 1 or area 1, that is considered the zone wherein too much tape slack is signalled. With respect to the reel 10, as illustrated in FIG. 2, zone 1 extends for a preselected arc in a clockwise direction from the post 22. The arc is defined in accordance with the loops that are considered too long for the system. The area or zone adjacent the zone 1 is the zone in which the arm 16 swings through when the correct or desired amount of tape slack is provided in the loop. A third zone, or the zone successively following zone 2 in the swinging of the arm 16 is the area through which the arm 16 swings when not enough tape slack is present in the loop, or a short loop has resulted. The same three zones are illustrated in FIG. 2 for the arm 17. Each arm 16 and 17 also mounts a cam, identified as the cams 24 and 25 mounted with the arms 16 and 17 respectively. Adjacent each cam 24 and 25 there is provided a pair of microswitches 26 and 27 for the cam 24 and microswitches 28 and 29 for the cam 25. When the arms 16 and 17 are positioned in zone 2, none of the microswitches 26–29 are operated and the system is in the desired operating state. Too much or too little tape slack is signalled when the arms 16 and 17 swing through into zone 3 zone 1. For example, when the arm 16 swings from zone 2 into zone 1, switch 27 is operated as a result of the outer profile of the cam 24 for signalling that the tape loop is too long. In the same fashion when the arm 16 swings from zone 2 into zone 3, the switch 26 is operated to indicate that the tape loop is too short. In the same fashion, the switches 28 and 29 are operated by the swinging arm 17 operaitng with the cam 25. The switch 29 is considered the long switch and the switch 28 the short tape switch. It will be appreciated that the definition of the profile for the cams 24 and 25 is such that at no time are both of the switches associated therewith in an operative position. Either one switch or the other is actuated as a result of the movement of the arms 16 and 17.

Each reel 10 and 12 is provided with an individual driving means or motor for driving the respective reels in either the forward or the reverse direction. Each reel is also provided with an individual brake that may be individually controlled for controlling the rotation of the reels 10 and 12. With respect to the schematic illustration of the control circuit of the present invention, the means for controlling the rotation of the reels for the left hand reel 12 comprises a motor 30 arranged with an electrically operated brake 31. The motor 30 is illustrated as having a pair of energizable windings for rotating the reels in either a clockwise or a counter-clockwise rotation. The winding 30A for the motor 30 is effective for rotating the reel 12 in a counter-clockwise direction, while the winding 30B arranged therewith is effective for rotating the motor shaft and thereby the reel 12 in a clockwise direction. In the same fashion, a motor 32 having a pair of windings 32A and 32B rotates the reel 10 in a clockwise direction when the winding 32A is energized and counter-clockwise when the winding 32B is energized. The motor 32 is also employed with a brake 33 further identified as the right brake, BR. Both the brakes 31 and 33 are shown with their energizable windings arranged across the diagonally opposite terminals of a full wave diode rectifying network for supplying current thereto. The opposite terminals of the diode networks for the brakes 31 and 33 are connected to a source of alternating current power. One terminal for each of the networks for the brakes 31 and 33, shown as the top terminals in FIG. 3A, are connected to one terminal of the alternating current source 34 by means of the lead wire 35. The diagonally opposite terminal for the brakes 31 and 33 are connected by means of the respective lead wires 36 and 37 through control elements to the lead wire 38 which is connected to the opposite terminal of the source of power 34. The switches 26–29 for signalling the length of slack in the tape loop are illustrated connected in circuit relationship with the motor and brakes and the control elements to be discussed hereinafter.

The power source for the control circuit also includes a source of direct current energy and which direct current power source is powered from the alternating current source by means of lead wires 40 and 41 and a transformer 42 having its secondary connected across a full wave diode rectifier 43. The direct current voltage is obtained from the lead wires 44 and 45. The direct current is employed for energizing the control relays for effecting the desired rewind operation in either the forward or reverse direction. For this purpose the rewind control elements include the rewind relay K102, the auxiliary rewind relay K103, the reverse rewind relay K104 and the relay K101. Each of these relays have one terminal connected in common with the DC power supply and is connected to the lead wire 44. In addition, the relays K103 and K104 are illustrated with a diode rectifier connected in parallel circuit relationship therewith in a conventional fashion for transient protection. All of these latter relays including relay K102 are controlled by the operation of the rewind switch S10. For this purpose, the rewind relay K102 has its coil connected to the forward terminal of the switch S10 through a pair of series diodes 46 and 47 arranged on opposite sides of a resistor 48. The diode 46 is connected to the forward terminal of the switch S10 with its anode connected to the switch terminal and its remaining electrode to the resistor 48. The anode terminal for the diode 47 is connected to resistor 48 and its opposite terminal to the relay winding K102. The auxiliary rewind relay K103 also has its coil connected to the forward terminal of the switch S10 through the diode 46 and a diode 50 and the normally closed contacts of a switch S11. The switch S11 is also a cam operated switch and control thereof will be explained more fully hereinafter.

The reverse rewinding relay K104 is connected to the reverse terminal S10 by means of a diode 51. The reverse rewind terminal of the switch S10 is also connected to a diode 52 whereby both diodes 51 and 52 have their anode electrodes connected to switch S10. The remaining electrode for the diode 52 is connected to the common junction between the diode 46 and the resistor 48. The relay winding K101 is connected to the direct current lead wire 44 at one terminal and to the forward terminal of switch S10 through the pair of contacts for the short switch 26 as well as to the reverse terminal of S10 through the pair of terminals for the short switch 28. The relay winding K101 is connected through a diode 52[a] to the normally open terminal of switch 26 and through a diode 53 to the normally open terminal of switch 28.

The relay K101 is arranged as a portion of a time delay circuit. Comprising the RC time delay circuit is the resistance of the relay coil for relay K101 and capacitor 71. A discharge path is provided for the capacitor 71 by a resistor 70 and the contacts 12–4 of relay K103, with the resistor 70 to contact 12 and with one terminal of capacitor 71 connected to contact 4. The remaining terminals of elements 70 and 71 are connected in common to the relay winding K101. The elements K101 and 71 are proportioned to provide a time delay on the order of approximately 0.75 second.

The central terminal for the switch S10 is connected directly to the negative terminal of the DC power supply by means of a lead wire 54. Also arranged with the direct current control circuit for actuating the switch S11 there is provided an alternating current motor 55 having an energizing winding connected to the alternating current power source 34 by means of the lead wires 35 and 38. The motor 55 also has a pair of windings for controlling the direction of rotation of the motor shaft in both the clockwise and the counter-clockwise direction. These windings are illustrated as four windings arranged in quadrature with one another. One pair of windings are shown connected in a closed loop through the normally open contacts 9–5 for the relay K103 for rotating the motor shaft in a clockwise direction whereas the other pair of windings are connected to a pair of normally closed contacts 9–1 for the relay K103. This latter pair of windings is effective for rotating the motor in a counter-clockwise direction.

The motor shaft mounts a cam (not shown) for operating the switch S11 between its two positions. The cam operated switch S11 is used to control the dropout time for the relay K104. For this purpose a pair of contacts 9–5 for the relay K104 are connected between the relay winding K104 to the normally open contacts for the switch S11 which are connected to the positive terminal of the DC source by means of the lead wire 45. In the same fashion the normally closed contacts for the switch S11 are arranged in parallel circuit relationship with the contacts 10–6 for the relay K103 to provide an energizing path for relay K103. Contacts 10–6 provide the holding path for relay K103 during rewind.

The motor 55 is also utilized to control the setting of a potentiometer for controlling the torque of a motor for a rewind operation. For this purpose the variable potentiometer 57 has its movable arm coupled to the shaft of the motor 55 and which potentiometer is connected in series circuit relationship with the winding for the motor 30 through the contacts for the relays K101, 102 and 103. The normally open contacts 11–7 for the relays K102 and K103 are arranged in series with the normally closed contacts 4–12 for the relay K101 and the potentiometer 57, with the opposite end of the potentiometer 57 being connected to normally closed contacts 10–2 of relay K104 to the motor 30. A pair of normally closed contacts, the contacts 11–3 for K103, are connected to the common junction between the aforementioned contacts for K102 and K103 to power the brakes 31 and 33 upon exiting from rewind only. These contacts are arranged in parallel circuit relationship through two paths for energizing the two brakes 31 and 33. The parallel path for the brake 31 is through the parallel network of contacts 11–7 and 11–3 of K104 with the resistance 58 and diode 59. Similarly the brake 33 is energized through the contacts 12–4 and 12–8 of relay K104 and resistor 60 and diode 61. The resistors 58 and 60 are to drop the amount of power to the associated brake in accordance with the direction of rewind. The contacts 11–3 for relay K102 are normally closed contacts and control the application of current to the switches 28 and 29 in the same fashion the normally closed contacts 12–4 for K102 control the application of power to the switches 26 and 27.

With the above structure in mind the logic for a rewind operation will be examined. The control circuit of FIGS. 3A and 3B is adapted to operate in conjunction with the sensing arms 16 and 17 and to be responsive to a signal provided by the arms swinging from zone 2 to zone 3 for indicating the lack of slack in the tape loop extending between the reels 10 and 12. When the rewind operation is initiated, the taking up of the slack in the loop is initiated at a predetermined speed in accordance with the setting of the potentiometer 57 and when the tape slack is omitted or about to be omitted from the tape loop the system or tape transport apparatus is momentarily stabilized to prevent any breakage in the tape upon the actual rewinding or transfer of tape from one reel to another. For this purpose, the rotation of both reels 10 and 12 is momentarily prevented after which time the tape is transferred from one reel to the other reel at a controlled acceleration rate which is a very slow rate that is gradually increased to a maximum speed to allow the tape to be transferred without breakage.

The combination of FIGS. 3A and 3B represent the circuit diagram for effecting the rewind and is illustrated for the condition when the tape transport system is in a tape reading operation or the normal condition before rewind is initiated.

Now referring to the graphical illustration of FIG. 4 wherein a comparison of the prior art acceleration curve is shown with that of the present invention, it will be seen that the acceleration curve for the prior art type of apparatus is indicated with a normal point of tape breakage. This normal point of tape breakage is the point in the tape transfer after the tape slack is taken up and the actual tape transfer between the reels is initiated which may be initiated with a sudden start that may cause the tape to break or be damaged. The present invention on the other hand initially takes up the tape slack and upon reception of the signal of the complete take up of the slack and during the interval when tape breakage normally occurs, the system is stabilized. After the system is stabilized by means of applying the brakes to the motors the actual transfer of tape to the reels is initiated at a relatively slow rate for starting the rest of the rewind cycle as illustrated in FIG. 4.

Now referring to FIGS. 2, 3A and 3B the operation of the control circuit for the spooling or rewinding operation will be examined. It will be assumed that the switch S10 is moved to a forward rewind position so that the tape is transferred from the reel 10 onto the reel 12. It should also be noted that the characteristics of the relays K103 and K102 are such that the winding K102 is a slower operating winding than K103 so that with the application of power to the control circuit the relay K103 will be operated before the relay K102. With the operation of the relay K102, its normally closed contacts 11–3 and 12–4 will be effective for removing power from both brakes 31 and 33 to allow the reels 10 and 12 to rotate. In addition, the normally closed contacts 9–1 for relay K103 arranged in field winding for motor 55 will open, while the normally open contacts 9–5 of K103 will close to cause the motor 55 to rotate in a clockwise direction. The rotation of the motor 55 in a clockwise direction will cause the arm for the potentiometer 57 to be driven from its maximum resistance end to the end of minimum resistance. Power will be applied to the speed control potentiometer 57 upon the operation of the relay K102 through the contacts 11–7. The relay K102 will be operated shortly after the motor 55 begins its rotation.

With the operation of relay K102, shortly thereafter the winding 30A or the counter-clockwise winding for the motor 30 is energized by means of the contacts 11–7 for relay K102, 11–7 for relay K103, contacts 4–12 for relay K101, the potentiometer 57 and the contacts 10–2 for relay K104. It will be noted that the reverse rewind relay K104 is not employed in the forward rewind operation and so its normally closed contacts 10 and 2 are maintained in their normally closed position. With the operation of the motor 30, the slack in the tape loop is stored on the reel 12. This transfer is produced with the motor 30 running at a relatively slow speed because of the maximum setting for the potentiometer 57. With the slack in the loop changing, the arms 16 and 17 are moving in zone 2 in a direction towards zone 3. At the interval that the arm 16 for the reel 10 crosses the point of transition between zone 2 and zone 3, the switch 26 is actuated as a result of the rotation of the cam 24. With this operation the ground potential is applied to relay winding K101 causing it to become energized. With the energization of K101, its normally closed contacts 4 and 12 arranged in series with the power circuit to the motor 30 removes power therefrom, while the normally open contacts 7 and 11 for the relay K101 now close and provide a power circuit through contacts 11–7 of K102 and the aforementioned parallel path to power the brakes 31 and 33. This causes the apparatus to come to a stop whereby the apparatus is stabilized for a predetermined interval. The predetermined interval is determined by the resistance-capacitance network associated with relay winding K101. The network comprising the elements K101 and 71 is defined to maintain the brakes 31 and 33 energized for approximately 0.75 second, at the end of which period the relay winding K101 again is de-energized and therefore removing the energizing from the brakes 31 and 33 and allowing the motor 30 to be re-energized. The motor 30 again begins rotating at the end of this period to cause the actual transfer of the tape from the spool 10 to the spool 12. It will be recalled that in the normal rewind operation that only one of the motors is driven and accordingly the spool 10 is free-wheeling in response to the drive afforded by the motor 30. The speed of the motor 30 at this interval is controlled by the setting of the potentiometer 57. With the continuous operation of the motor 55 the setting for the potentiometer 57 is driven from its maximum resistance value to its minimum resistance value so that the motor 30 gradually increases in speed until the minimum setting is reached. The motor then continuously rotates at full speed as long as the switch S10 remains in the forward position to complete the rewind operation.

With the removal of the rewind signal or the placement of switch S10 in a neutral position, relay K103 becomes de-energized before the slower operating relay K102. With the de-energization of K103 its contacts arranged in the field circuit for the motor 55 will cause the motor to rotate in the opposite direction to cause the movable arm for the potentiometer 57 to be driven back to its maximum resistance position. Simultaneously, the contacts 11–7 for the relay K103 will remove power from the potentiometer 57. The contacts 11–3 of K103 will provide power through the pair of parallel networks. A half-wave, rectified direct current provided by contacts 12–4 of K104 and the diode 61 will be applied to the right hand brake 33. The power applied to the left hand brake from the voltage network is applied through the diode 59 through the potentiometer 58 and contacts 11–3 of K104. The potentiometers 58 and 60 are used for the forward and reverse rewind operations respectively and are proportioned to reduce the current applied to their brakes of the energized motor since its required braking torque is less than that of the reel being unwound. This minimizes the possibility of slack tape occurring between the reels at the end of the rewind operation.

The operation of the control circuit for a reverse rewind operation is essentially identical to that discussed hereinabove for a forward operation. In the reverse operation, however, the relay K104 is employed in addition to relays K102 and K103. The selection of the reverse rewind by means of switch S10 then energizes relay K104 which then switches the power from the potentiometer 57 to the right drive motor 32. Upon exit from reverse rewind, the operation of K104 causes the potentiometer 60 to brake the right hand motor 32 through contacts 12–8 of K104 and diode 61. The cam operated switch S11 associated with the motor 55 is employed to control the dropout time for relay K104. Shortly after the motor 55 has begun rotation, the cam de-actuates switch S11 and provides a holding path for the contacts 9–5 of the relay K104 to hold the relay winding in an energized condition until motor 55 and potentiometer 57 drive to their maximum counter-clockwise position.

What is claimed is:

1. In a control circuit including
- a pair of spaced rotatable tape storage reels adapted for transferring tape stored on one of the reels to the other reel with the tape extending between the reels,
- means for controlling the rotation of said reels,
- means for sensing the amount of tape slack extending between the reels and providing a signal representative of lack of slack,
- and control means connected to be responsive to said latter means and said rotation control means to effect the transfer of tape between the reels, said control means causing the transfer of tape between the reels upon energization thereof until the sensing means provides the lack of slack signal to initiate the stopping of the tape transfer to stabilize the apparatus and then continuing the tape transfer.

2. In a control circuit including
- a pair of spaced rotatable tape storage reels adapted for transferring tape stored on one of the reels to the other reel and having tape extending beteen the reels,
- individual drive means for each of said reels,
- individual braking means for each of said reels,
- means for energizing one of the drive means for a preselected interval to transfer tape from one reel to the other reel,
- means for sensing slack in the tape extending between the reels and for providing a signal indicative of the lack of slack.
- and control means connected to be responsive to the lack of slack signal for energizing each of the braking means and de-energizing the energized drive means for a preselected interval and then de-energizing the brake means and re-energizing the one drive means to complete the transfer of the tape between the reels.

3. In a control circuit as defined in claim 2 wherein the control means includes means for gradually increasing the speed of the drive means during the transfer of the tape between the reels.

4. In a reel to reel tape transport system for transferring tape from one storage reel to another storage reel including
- a pair of rotatable tape storage reels mounted in a spaced apart relationship and having tape extending between the reels,
- a swingable tape sensing and guiding arm mounted with each reel and engaging the tape extending between the reels to be movable in accordance with the amount of tension on the tape, said arms being swingable between three zones for signalling the amount of slack in the tape extending between the reels, the three zones corresponding to too much tape slack, too little tape slack and the correct amount of tape slack, means for biasing each of the arms in the direction of too much tape slack, signalling means coupled to each of said arms for signalling the passing of the arm from one zone to another zone, individual means for controlling the rotation of said reels, control means for energizing the individual means and connected to be responsive to the signalling means, said control means including time delay means connected to be responsive to the signalling means signalling too little tape slack for operating the individual means to stabilize the reels for the time delay period.

5. In a reel to reel tape transport system as defined in claim 4 wherein said control means includes automatic speed control means for controlling the speed of rotation of the reels to cause the tape to be transferred at a relatively low rate prior to the time delay period and a gradually increasing rate after the time delay period.

6. In a reel to reel tape transport system as defined in claim 5 wherein said automatic speed control means comprises a motor operated potentiometer.

7. A method of transferring tape from one storage reel to another storage reel including the steps of:

initiating the transfer of tape from one reel to the other reel at a preselected speed for eliminating any slack in the loop of tape extending between the reels.

sensing when all of the tape slack is eliminated.

after all the tape slack is eliminated, preventing the rotation of the reels for a preselected interval, and re-initiating the transfer of tape after the preselected interval with the tape being transferred at a preselected rate of travel at a controlled, gradually increasing rate of speed until a preselected maximum rate of travel is reached.

References Cited

UNITED STATES PATENTS

| | | | |
|---|---|---|---|
| 3,269,670 | 8/1966 | Brian et al. | 242—55.12 |
| 3,347,481 | 10/1967 | Epstein et al. | 242—75.51 X |

GEORGE F. MAUTZ, Primary Examiner

U.S. Cl. X.R.

242—75.51; 318—6